United States Patent
Dunker et al.

(10) Patent No.: US 7,169,428 B2
(45) Date of Patent: Jan. 30, 2007

(54) DAIRY COMPOSITIONS AND METHOD OF MAKING

(75) Inventors: John M. Dunker, Rogersville, MO (US); Michael J. McCloskey, DeMotte, IN (US); Timothy J. Gomez, Artesia, NM (US)

(73) Assignee: Select Milk Producers Inc., Artesia, NM (US)

( * ) Notice: Subject to any disclaimer, the term of this patent is extended or adjusted under 35 U.S.C. 154(b) by 194 days.

(21) Appl. No.: 10/229,462

(22) Filed: Aug. 27, 2002

(65) Prior Publication Data

US 2004/0040448 A1    Mar. 4, 2004

(51) Int. Cl.
*A23C 9/14* (2006.01)
*B01D 61/00* (2006.01)

(52) U.S. Cl. ............ 426/580; 426/478; 426/491; 426/492; 210/650

(58) Field of Classification Search ........ 426/580, 426/583, 587, 478, 491, 492; 210/650
See application file for complete search history.

(56) References Cited

U.S. PATENT DOCUMENTS

| 5,616,249 A | 4/1997 | Hodgdon |
| 5,685,990 A | 11/1997 | Saugmann et al. ........ 210/650 |
| 5,888,401 A | 3/1999 | Nguyen |
| 6,251,459 B1 | 6/2001 | Schroder ................ 426/330.2 |
| 6,399,140 B1 | 6/2002 | Allen et al. ................ 426/649 |
| 6,478,969 B2 | 11/2002 | Brantley et al. |
| 2003/0059512 A1 | 3/2003 | Kopf et al. ................ 426/582 |
| 2005/0214409 A1 | 9/2005 | Tossavainen et al. ......... 426/34 |

FOREIGN PATENT DOCUMENTS

| WO | WO99/37162 | 7/1999 |
| WO | WO00/29100 | 5/2000 |
| WO | WO01/03515 | 1/2001 |
| WO | WO01/93689 | 12/2001 |
| WO | WO03/008077 | 1/2003 |
| WO | WO03/094623 | 11/2003 |

OTHER PUBLICATIONS

Hinrichs, J., UHT Processed Milk Concentrates, Lait 80 (2000), pp. 15-23.
European Search Report, Sep. 26, 2005, European Patent Office.

*Primary Examiner*—Leslie Wong
(74) *Attorney, Agent, or Firm*—Morgan Lewis & Bockius

(57) ABSTRACT

The invention relates to a method of separating components from milk, and the apparatus used therefor. The invention also relates to compositions prepared from the separated components. The present invention relates to nutritional milk compositions and products which are designed to include per serving size a specified percentage range of one or more components separated from milk. The compositions of the present invention can optionally include non-essential but nutritionally functional components. The complete nutritional milk compositions of the present invention can be provided as unflavored milks, flavored milks, ice creams and yogurts.

13 Claims, 3 Drawing Sheets

DAIRY COMPOSITIONS AND METHOD OF MAKING

FIELD OF THE INVENTION

This invention relates to an apparatus for separating milk into individual components, a method of separating components from milk, and compositions prepared from the separated components.

BACKGROUND OF THE INVENTION

Nutrition is one of the cornerstones of health, well-being, and the prevention of numerous chronic diseases. Nutritional products play an important role in these areas and attempts to provide readily available and convenient nutritional products to the general public has been a major focus in recent years. To remain healthy one must receive essential nutrients which are indispensable to human nutrition. Essential nutrients include both macronutrients, such as fats, carbohydrates and proteins, and micronutrients, such as vitamins and minerals (including trace elements and electrolytes).

Milk products constitute a significant portion of the overall diet or calorie consumption of human beings. As such, milk products play a major role in maintaining the health of the public. Nutritionally optimal milk products will have a positive effect on the nutrition and the health of the public. Concentration of macronutrients in any given milk product will often depend on the nature of the product and the desirable profile developed by the manufacturer.

For example, bovine milk contains about 87% water, 3% protein, 0.65% whey, 4.5% to 5.0% lactose, 3% to 4% milk fat, 0.3% to 0.7% mineral salt plus a variety of water and fat soluble vitamins, lactic and citric acids, urea, free amino acids and polypeptides. One or more of these components may be separated from milk to produce various compositions. For example, in the manufacture of cottage cheese or casein, milk fat is first separated centrifugally (as cream) and the casein fraction of the milk is then precipitated at its isoelectric point by the addition of acid. The remainder of the original milk, containing all of the other components listed above, is called whey i.e., milk, from which the casein and a majority of the milk fat has been removed is referred to as whey.

Whey in turn can be subjected to filtration to produce a retentate and permeate that can be incorporated into a food product, like a beverage or dry food. For example, raw milk has been filtered to produce a substantially pure dairy water that can be incorporated into a beverage or dairy product for consumption, the dairy water being substantially pure and free of impurities present in the original raw milk.

It is desirable to exploit the nutritional advantages present in milk by separating milk into its individual components and to produce dairy compositions suitable for consumption by using these individual components in food products.

SUMMARY OF THE INVENTION

It is an object of the present invention to provide an apparatus that may be used for the separation of milk into its individual components.

The invention further provides a method of separating components from milk, and compositions prepared from these components. The present invention relates to nutritional milk compositions and products which are designed to include a specified percentage range of one or more components separated from milk for a specific serving size. Separation of milk components using the method of the present invention can be achieved by separation processes, including but not limited to, membrane filtration processes. The compositions of the present invention may include non-essential but nutritionally functional components. The nutritional milk compositions of the present invention can be provided as unflavored milks, flavored milks, ice creams, yogurts, cheeses and any nutritional product that can be prepared from milk or milk components.

It is an object of the invention to provide a method for separation of milk into several separate components. It is also an object of the invention to provide new compositions prepared from the separated milk components. These and other objects of the invention will be apparent from the following description.

BRIEF DESCRIPTION OF THE DRAWINGS

The invention will be better understood by reference to the following detailed description of the preferred exemplary embodiment when read in conjunction with the appended drawing.

DETAILED DESCRIPTION OF ILLUSTRATIVE EMBODIMENTS

The present invention relates to nutritional milk compositions and milk products which are designed to include specific components of milk. The compositions of the present invention can optionally include non-essential, but nutritionally functional components. As used herein, the terms "components of milk" or "milk components" are intended to refer to individual components of milk such as, but not limited to, butter fat, milk protein, non-protein nitrogen, lactose and minerals.

As used herein, the term "dairy products" or "dairy compositions" are those comprising one or more milk components.

The complete nutritional milk compositions of the present invention can be provided as unflavored milks, flavored milks, ice creams, yogurts, cheeses and any nutritional product that can be prepared from milk or milk components.

As used herein the term "milk" includes fat-free milk, low fat milk, full fat milk, lactose-free milk (produced by hydrolyzing the lactose by lactase enzyme to glucose and galactose, or other method), concentrated milk or dry milk. Fat-free milk is nonfat or skim milk product. Low-fat milk is typically defined as milk that contains from about 1% to about 2% fat. Full fat milk often contains about 3.25% fat. As used herein, the term "milk" is also intended to encompass milks from animal and plant sources. Animal sources of milk include, but are not limited to, human, cow, sheep, goat, buffalo, camel, llama, mare and deer. Plant sources of milk include, but are not limited to, milk extracted from soy bean. In addition, the term "milk" refers to not only whole milk, but also skim milk or any liquid component derived therefrom. By "whey" is meant the milk component remaining after all or a substantial portion of the milk fat and casein contained in milk are removed. All percentages expressed herein are weight percentages (wt %), unless indicated otherwise.

Figure 1:
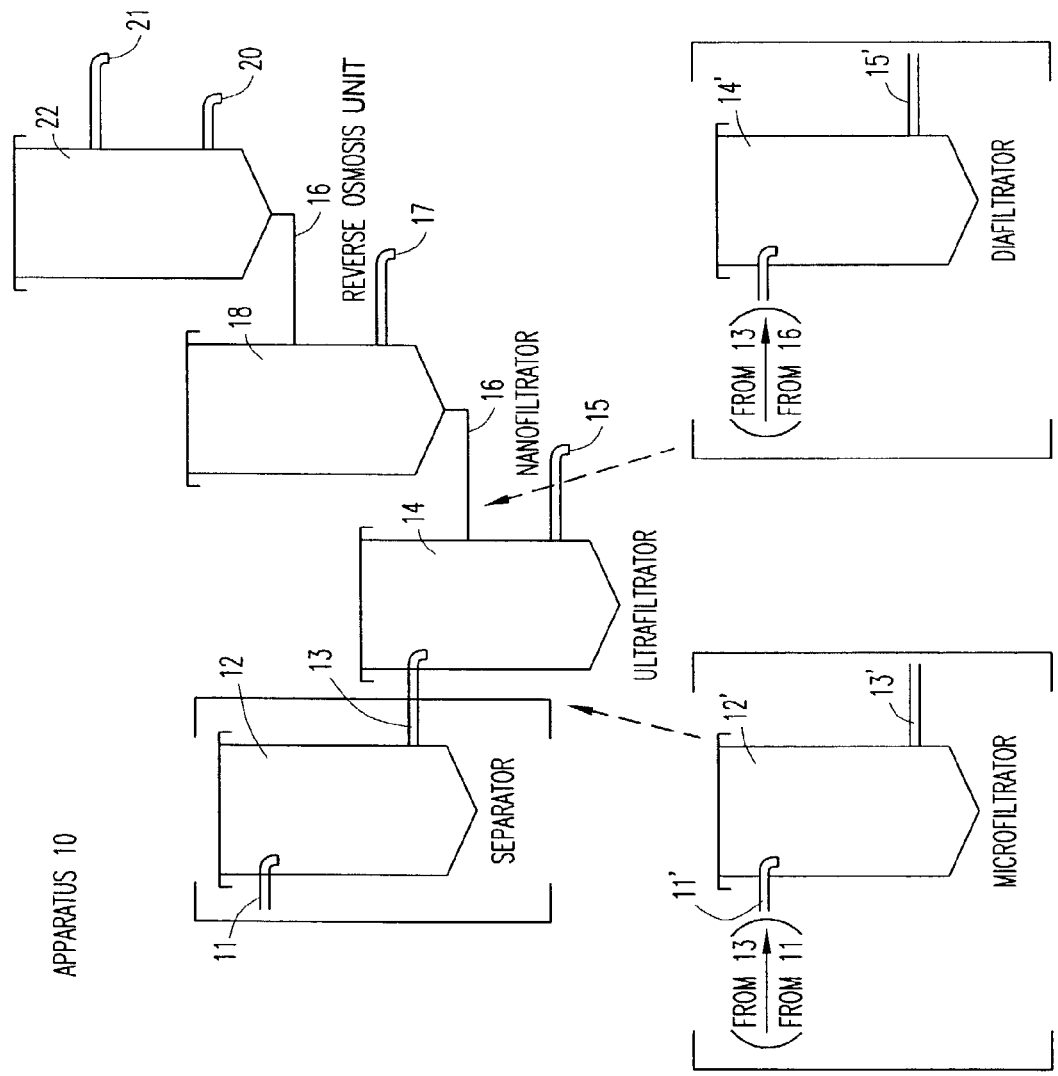
FIG. 1 is a schematic view of the apparatus used for the separation of milk into individual components in accordance with the present invention.

In a first embodiment of the invention, an apparatus 10 is provided (FIG. 1). The apparatus comprises an ultrafiltrating means (14), a nanofiltrating means (18) and a reverse osmosing means (22). In certain embodiments of the invention, the apparatus optionally comprises a separating means (12), a microfiltrating means (12') or a diafiltrating means (14'), either individually or in combination.

Figure 3:
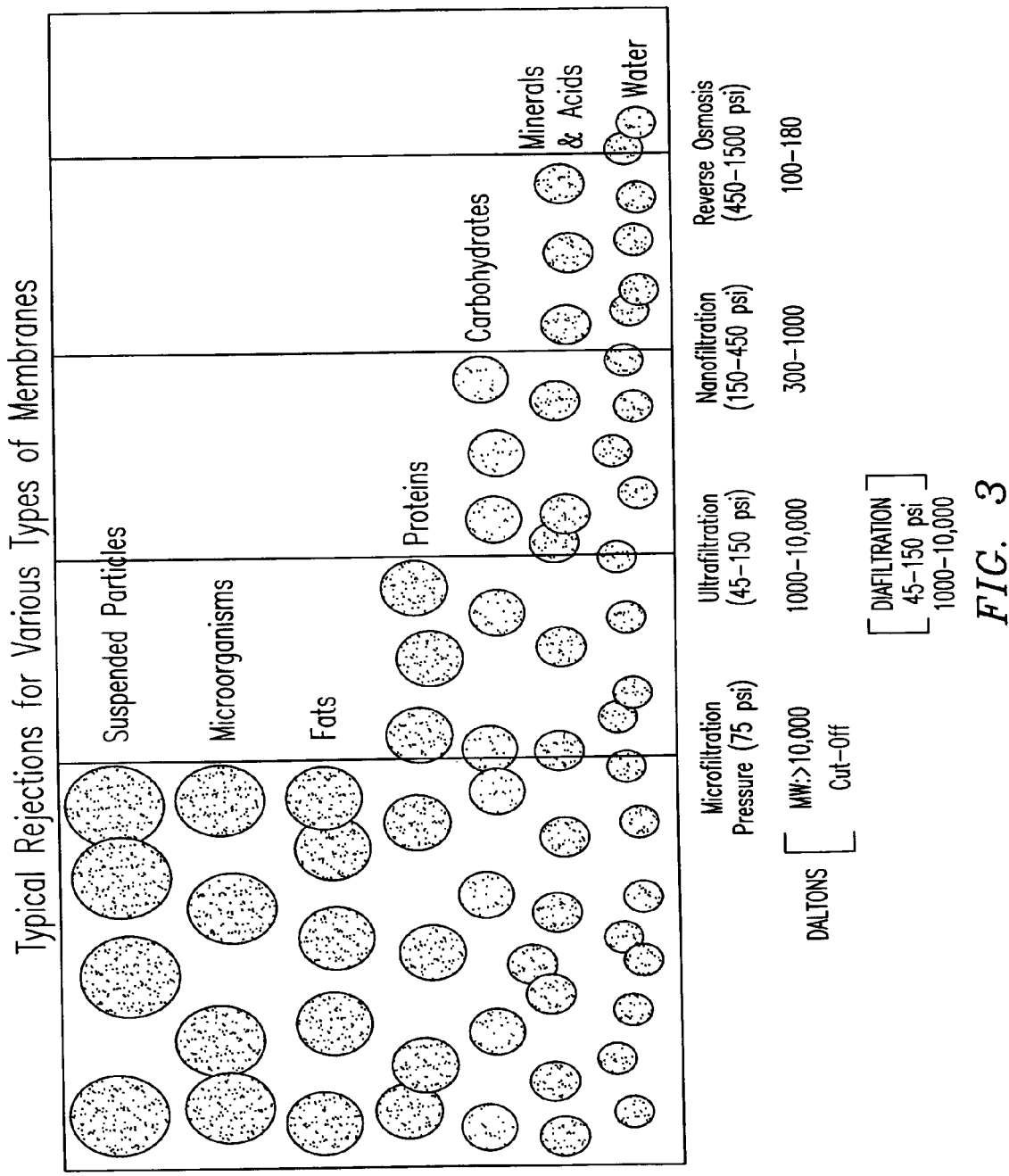
FIG. 3 represents the filtration of individual milk components on the basis of molecular size using filters of varying porosity at varying pressures.

In an embodiment of the invention, an end inlet 11 is provided through which milk is fed into a (optional) separating means 12, where the milk is separated into butter fat (cream) and skim milk. From the separating means, an outlet 13 transports the skim milk into an ultrafiltrating (UF) means 14, to yield a UF permeate component and a UF retentate component. Preferably, the step of ultrafiltration is performed through a membrane filter that excludes components having a molecular weight of at least as low as about 1 kDa but not higher than about 10 kDa, and more preferably not higher than about 5 kDa, at pressures between about 45–150 psi (FIG. 3). In certain embodiments of the invention, where the optional separating means is excluded from the apparatus step, the milk is fed directly to the UF means.

In certain embodiments of the invention, an optional microfiltrating means (12') is included either between the separating means (12) and the ultrafiltrating means (14), or in place of the separating means. The outflow from 11 or 13 is fed through an inlet 11' into a microfiltrating means 12' (MF), to yield a MF permeate component and a MF retentate component. Preferably, the step of microfiltration is performed through a membrane filter that excludes components having a molecular weight not higher than about 10 kDa, at pressures of at least about 75 psi (FIG. 3).

The UF permeate is transported through 16 to a nanofiltrating (NF) means 18. The UF retentate is removed from the ultrafiltrating means through an outlet 15. The UF permeate is nanofiltered in the nanofiltrating means to yield a NF permeate and a NF retentate. Preferably, the NF permeate results when UF permeate is passed through a filter that excludes components having a molecular weight of at least as low as about 1000 daltons, at pressures between about 150–450 psi (FIG. 3). The NF retentate is removed from the nanofiltrating means 18 through an outlet 17. The NF permeate is transported via 19 to a reverse osmosing means 22, where it is subjected to a reverse osmosis (RO) process to yield a RO retentate and a RO permeate. Preferably, the RO permeate results when the NF permeate is passed through a filter that excludes components having a molecular weight at least as low as about 180 daltons, at pressures between about 450–1500 psi (FIG. 3). The RO retentate is removed via an outlet 20 and the RO permeate is removed through an outlet 21.

In certain embodiments of the invention, the UF membrane filtrating means is optionally combined with a diafiltrating (DF) means. The outflow from 13 or 16 is fed into a DF device (14') to yield a DF permeate component and a DF retentate component. Preferably, the step of diafiltration is performed through a membrane filter that excludes components having a molecular weight of at least as low as about 1 kDa but not higher than about 10 kDa, and more preferably not higher than about 5 kDa, at pressures between about 45–150 psi (FIG. 3). In the diafiltration step, the filtration step is performed in the presence of water to lower the lactose concentration of a mixture while maintaining the protein concentration.

Figure 2:
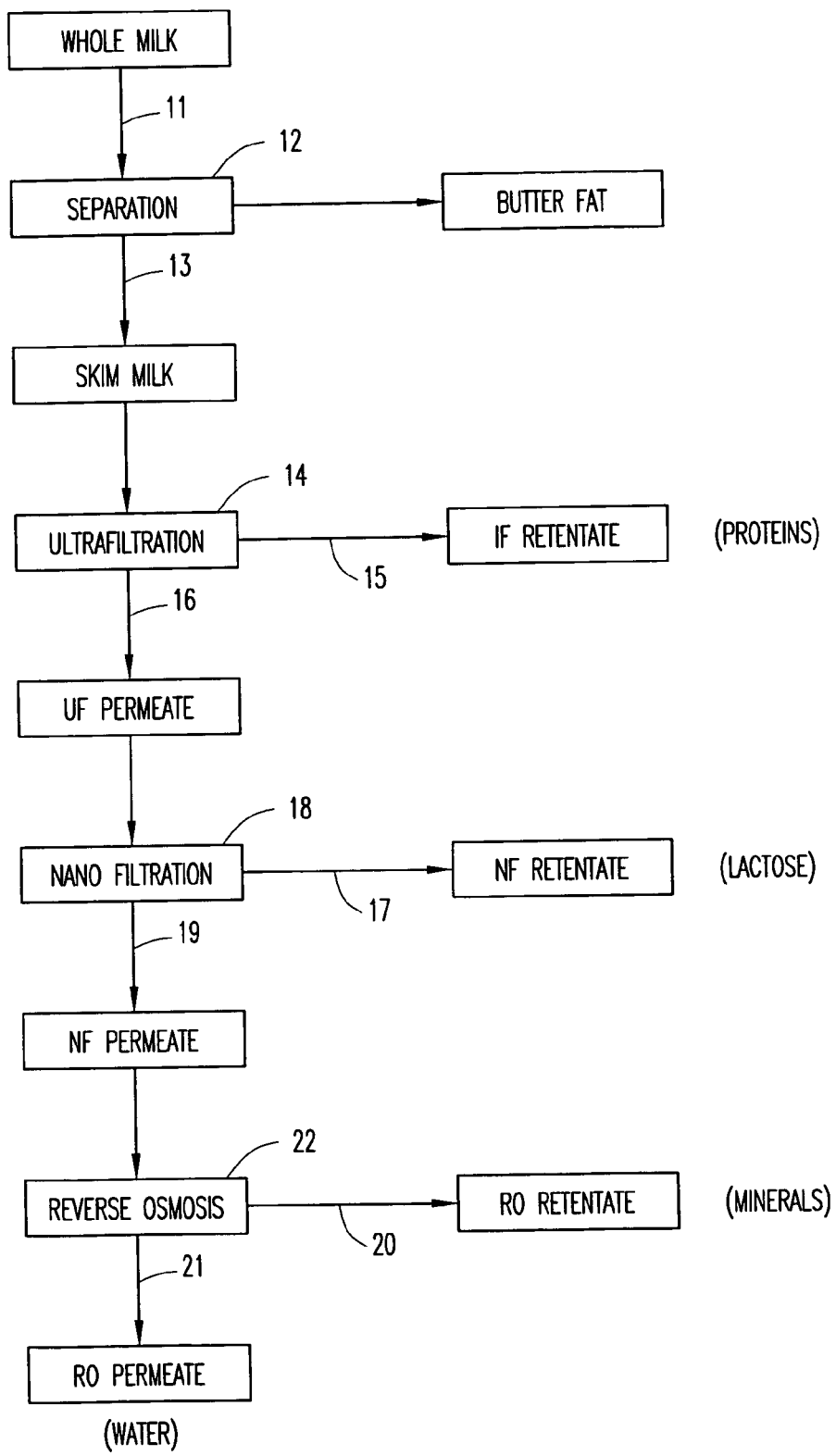
FIG. 2 shows a flow diagram representing the steps involved in the process of separation of milk components from whole milk in accordance with the present invention.

In an embodiment of the present invention shown in FIG. 2, a method is provided which comprises, ultrafiltrating the milk to produce a first liquid permeate ("UF" permeate) and a first retentate ("UF" retentate); nanofiltrating the first liquid retentate to produce a second liquid permeate ("NF" permeate) and a second retentate ("NF" retentate); and, reverse osmosis of the second liquid permeate to produce a third liquid permeate ("RO" permeate) and a third retentate ("RO" retentate). In an embodiment of the invention, a method of separating milk into milk components is practiced in the apparatus described above and in FIG. 1. In a separate embodiment of the invention, the milk fed into the UF means is first passed through a separator.

In the separation step of the invention, milk is treated in a separator 12, which is known in the art, to separate out the butter fat or cream ("BF") from the remainder of the milk. The milk product remaining after the butter fat is separated contains no more than 0.1% fat and is referred to hereinafter as skim milk.

Milk is passed through an ultrafiltrating (UF) means 14 to yield a UF permeate component and a UF retentate component. The protein content of the UF permeate is preferably no more than about 0.5 wt %, and more preferably no more than about 0.3 wt. %. The UF retentate comprises at least 9 wt % protein, and more preferably between 9.5–16 wt % protein, and further comprises at least 4 wt % lactose, and more preferably between 4–6 wt % lactose.

In an embodiment of the invention comprising a diafiltrating (DF) means, the UF permeate is diafiltered through a DF 14', to produce a DF permeate and a DF retentate. The protein content of the DF permeate is preferably no more than about 0.5 wt %, and more preferably no more than about 0.3 wt. %. The DF retentate comprises at least 9 wt % protein, and more preferably between 9.5–16 wt % protein, and further comprises no more than 3 wt % lactose and preferably no more than 1% lactose.

The UF permeate and DF permeate are nanofiltered or passed through a nanofiltration (NF) process 18 to produce a NF permeate and a NF retentate. The NF permeate contains less than 0.15 wt % lactose, and more preferably no more than 0.05 wt %. The NF permeate is meant a liquid portion of milk or whey which is collected upon passage of milk or whey, or liquid fraction of milk or whey, through a filter having a molecular size exclusion sufficient to filter out at least about 95 wt % of true milk proteins, such that the NF permeate is rendered substantially protein-free.

In an embodiment of the invention, the NF retentate comprises at least 13 wt % lactose, and more preferably between 13–17 wt % lactose. The NF permeate is a liquid portion of milk which is collected upon passage of UF permeate through a filter having a molecular size exclusion sufficient to filter out greater than 99.5% of lactose, such that the NF permeate is rendered substantially protein-free and lactose-free.

The NF permeate is processed by reverse osmosis 22 to yield a RO permeate that contains less than 0.05 wt % lactose and less than 0.05 wt % minerals. The RO permeate is a liquid portion of milk which is collected upon passage of NF permeate though a filter having a molecular size exclusion sufficient to filter out greater than 99.5% of minerals, such that the RO permeate is substantially protein-free, lactose-free and mineral-free. The RO retentate contains at least 0.5 wt % minerals and more preferably at least 0.75 wt % minerals.

The present invention provides dairy compositions that possess ranges in fat content, protein content, lactose content, and mineral content. In other words, it is an object of the present invention to provide compositions that possess varying ranges of fat, protein, lactose and minerals.

The compositions of the present invention are formulated such that they are derived by combining the various components separated from milk by the method of the present invention.

In an embodiment of the invention, one or more milk components is combined to produce compositions of the present invention. There are several embodiments of the invention including, without limitation, the following compositions.

1. A blend composition comprising 1–3 wt % butter fat, 2.5–5.5 wt % protein, 0.5–1.0 wt % minerals and 1–3 wt % lactose is prepared by combining the butter fat separated from whole milk with UF retentate, RO retentate and either water or RO permeate.
2. A low-fat, high-protein composition comprising 0.1–0.3 wt % butter fat, 6–9 wt % protein, 1–2 wt % minerals and 2–5 wt % lactose is prepared by combining the butter fat separated from whole milk with UF retentate, RO retentate and either water or RO permeate.
3. A no fat, high protein, high minerals and low lactose compositions, comprising UF retentate, RO retentate, and either water or RO permeate.
4. A low lactose, low fat, low protein and high mineral products, comprising RO retentate.
5. A low fat, high protein, low lactose and high mineral products, comprising UF retentate and RO retentate.
6. Compositions prepared from one or more milk components selected from the group consisting of butter fat, skim milk, MF permeate, MF retentate, UF permeate, UF retentate, DF permeate, DF retentate, NF retentate, NF permeate, RO permeate and RO retentate.

In an embodiment of the invention, a low lactose composition is disclosed, comprising one or more milk components, wherein the concentration of lactose in said composition is lowered by non-enzymatic methods, for e.g., separation processes. In an embodiment of the invention, a low lactose composition is disclosed, comprising one or more milk components, wherein the concentration of lactose in said one or more milk components is lowered by non-enzymatic methods, for e.g., separation processes. In an embodiment of the invention, low lactose compositions of the invention are prepared using a membrane filtration process. In an embodiment of the invention, the low lactose compositions of the invention comprise less than about 1 wt % to about 3 wt % of lactose. In an embodiment of the invention, the low lactose compositions of the invention comprise less than 2 wt % of lactose. As used herein, the term "low lactose composition" is intended to refer to compositions which comprise less than about 1 wt % to about 3 wt % of lactose, and more preferably less than 2 wt % of lactose.

The compositions of the present invention may be concentrated by any number of methods including but not limited to evaporation, and filtration processes like reverse osmosis, in order to provide the milk components in a concentrated composition or format. In other words, the compositions of the present invention are prepared from one or more milk components selected from the group consisting of butter fat, skim milk, MF permeate, MF retentate, UF permeate, UF retentate, DF permeate, DF retentate, NF retentate, NF permeate, RO permeate and RO retentate, and in certain embodiments of the invention, the compositions are concentrated by known methods in the art including, but not limited to, evaporation, to provide the milk components of the compositions in a more concentrated format.

Certain embodiments of the invention provide a dairy composition derived from milk components comprising from about 0.05 wt % to about 5.5 wt % butter fat, from about 3 wt % to about 10 wt % of protein, less than 1 wt % lactose and from about 0.65 wt % to about 2 wt % minerals. An embodiment of the present invention further provides a dairy composition derived from milk components comprising from about 0.05 wt % to about 5.5 wt % butter fat, from about 3 wt % to about 10 wt % of protein, from about less than 1 wt % to about 10 wt % lactose and from about 0.65 wt % to about 2 wt % minerals.

The compositions of the present invention can be formulated into different types of dairy products. For example, the dairy product can be an unflavored or a flavored milk. Additionally, the dairy product can be a dairy drink, dairy beverage or a dairy cocktail. Such drinks, beverages or cocktails are products that contain the compositions in a diluted form. Such diluted forms can include, as nonlimiting examples, a fruit juice or a carbonated soda as a diluent combined with the compositions.

The compositions can also be frozen to yield an ice cream or other frozen desert. The ice creams can be formulated into a standard ice cream containing about 10 wt % milk fat, a premium ice cream containing about 15 wt % milk fat and a super premium ice cream containing about 17 wt % milk fat. Other milk fat levels are contemplated with the compositions. Additionally, non-dairy fats are also contemplated. Furthermore, other frozen deserts, such as sherbets, sundaes, or partially frozen deserts, such as milk shakes, may suitably be made from the compositions.

Additionally, the compositions can be formulated into a yogurt. Yogurt is produced by culturing the compositions of the present invention with a bacterial culture such as lactic acid-producing bacteria, *Lactobacillus bulgaricus* and *Streptococcus thermophilus*. Yogurts prepared using the compositions of the present invention can be set yogurts where the fermentation occurs in the final retail container or stirred yogurts where the fermentation occurs in bulk prior to packaging. Furthermore, these yogurts can contain flavors or fruits, can be frozen to provide a frozen yogurt or can be in the form of a drinkable fluid to provide a drinkable yogurt.

The compositions of the present invention can be optionally fortified with a protein source, a mineral source, a carbohydrate source or a mixture. Examples of fortifying sources include sources of calcium, vitamin D and sources of protein. The protein source may be selected from a variety of materials, including without limitation, milk protein, whey protein, caseinate, soy protein, egg whites, gelatins, collagen and combinations thereof. Included in the protein source are lactose-free skin milk, milk protein isolate, and whey protein isolate. It is also contemplated to use soy milk with the present compositions. As used herein, "soy milk" or "milk from soy bean" refers to a liquid made by grinding dehulled soy beans, mixing with water, cooking and recovering the dissolved soy milk out of the beans. Such soy milk can be formed into a milk-like product, which has similar taste, texture and appearance to animal (dairy) milk, but is essentially free of animal (dairy) milk. Furthermore, a dairy-like product, which as used herein refers to a product having similar taste, texture and appearance to diary products made from animal milk, but does not contain animal milk, can be made from such milk-like products. The carbohydrate source useful in the present invention may be selected from a wide variety of materials such as sucrose, corn syrup solids, glucose, fructose, maltodextrin and combinations thereof.

Artificial sweeteners such as saccharine, aspartame, asulfame K, sucrolose and their combination, as well as others, may be incorporated to enhance the organoleptic and sweetness quality of the compositions. Various fiber sources may be included in the compositions of the present invention. These sources may be selected from such materials as oat fiber, soy fiber, guar gum, pectin, soy polysaccharides, gum arabic, hydrolyzed fibers and the like. Cellulose, hemicellulose, hydrocolloides, methylcellulose, carboxymethyl cellulose and the like are contemplated. Also useful are fructooligosaccharides.

Compositions of the present invention can be formulated into a variety of different product forms. For example, forms can include, but are not limited to, high protein and fiber-containing, fat-free (skim), 1 wt % low fat, 2 wt % low fat, full fat (3.4 wt %), skim plus nonfat milk solids and lactose-free skim milks. Furthermore, where fat free (nonfat or skim) milk is used, the milk may be partially evaporated or has added nonfat milk solids to yield a product with a rich creamy taste. The compositions can be flavored with natural or artificial ingredients. Such ingredients may be combined with the compositions to form a substantially uniform flavored product or may be present in a non-uniform manner, such as fruit on the bottom of a yogurt composition. Non-limiting examples of flavored compositions include chocolate, strawberry, peach, raspberry, vanilla, banana, coffee, mocha and combinations thereof.

Various non-nutritive components can be included in the compositions. For example, fillers, coloring agents, flavors, emulsifiers and the like are useful. Other nutritionally valuable, but non-essential components can be added, including choline, taurine, L-carnitine and the like. Combinations of these non-nutritive and non-essential components are contemplated.

Various nutraceuticals and phytochemicals can be incorporated into the compositions for their intended function. Furthermore, it is contemplated that the compositions can be used in other dairy products, such as but not limited to cheeses, creams, custards, and the like.

The compositions may be packaged for consumption and sale in an assembly comprising a gable-top carton, a plastic container, a glass container, a paper container, a cardboard container or a metal container.

WORKING EXAMPLES

Example 1

In an embodiment of the invention, the components of milk were separated out using the following apparatus. A CMRPX 618-HGV cold milk separator (Alfa Laval) was used to perform cold bowl mechanical separation of milk into cream and skim milk by means of centrifugal forces at a temperature below 45° F. Following the separation of cream, the skim milk was passed sequentially through an ultrafiltration system, a nanofiltration system and a reverse osmosis system. The ultrafiltration system employed membrane filters having a molecular exclusion range of about 1000 to 10,000 daltons (FIG. 3). The ultrafiltration process was carried out at temperatures below 45° F. in a single pass system where the flow of milk is unidirectional and the milk does not pass over the same membrane twice during passage. Following ultrafiltration, the permeate obtained from the ultrafiltration process was passed through a nanofiltration system, which employed membrane filters having a molecular exclusion range of about 300 to 1000 daltons. Following nanofiltration, the permeate was subjected to reverse osmosis using membrane filters having a molecular exclusion range of about 100–180 daltons.

The sequence of the method for separating out the components in milk is shown in FIG. 2. Table 1 below represents a typical composition profile for milk components isolated by the method of the claimed invention.

TABLE 1

| Product | Butter Fat | Protein | Non-protein Nitrogen | Lactose | Minerals |
|---|---|---|---|---|---|
| Whole Milk | 3.64% | 3.13% | 0.19% | 4.83% | 0.79% |
| Skim Milk | 0.12% | 3.23% | 0.19% | 4.94% | 0.71% |
| Cream | 44.1% | 1.77% | 0.11% | 2.88% | 0.47% |
| UF retentate | 0.43% | 12.73% | 0.23% | 6% | 1.72% |
| UF permeate | 0.03% | 0.02% | 0.17% | 4.37% | 0.61% |
| NF retentate | 0.01% | 0.03% | 0.35% | 15.56% | 1.96% |
| NF permeate | 0% | 0.03% | 0.07% | 0.01% | 0.11% |
| RO retentate | 0.02% | 0.02% | 0.26% | 0.04% | 0.71% |
| RO permeate | 0% | 0% | 0.02% | 0% | 0% |

Tables 2A and 2B show a comparison of the range of milk components isolated by the method of the claimed invention in the presence (Table 2A) and absence (Table 2B) of a separation step.

TABLE 2A

Ranges of Components (Separator Step Included)

| Product | Butter Fat | Protein | NPN | Lactose | Minerals |
|---|---|---|---|---|---|
| Whole Milk | 3.2–5.0 | 2.8–4.5 | 0.19 | 4.5–5.5 | .65–1.0 |
| Skim Milk | .05–2.0 | 2.95–4.65 | 0.19 | 4.6–5.6 | .60–.95 |
| Cream | 36.0–48.0 | 1.5–2.25 | 0.11 | 2.5–3.0 | .40–.60 |
| UF Retentate | .15–.70 | 10.0–16.0 | 0.23 | 4.5–6.0 | 1.50–1.85 |
| UF Permeate | 0.0–0.25 | 0.0–0.3 | 0.17 | 4.2–5.5 | .5–.75 |
| Dia-Filtration | .15–1.0 | 10.0–16.0 | 0.1 | <1.0–3.0 | 1.10–1.60 |
| Dia-Permeate | 0.0–0.25 | 0.0–0.3 | 0.1 | 2.0–3.5 | .35–.65 |
| NF Retentate | 0.5–1.25 | 0.0–1.0 | .30–.40 | 13.0–17.0 | 1.80–2.10 |
| NF Permeate | 0.0–0.1 | 0.0–0.1 | 0.05–0.1 | 0.05–0.15 | .05–.15 |
| RO Retentate | 0.0–0.1 | 0.0–0.1 | 0.1–0.3 | 0.02–0.06 | 0.5–0.75 |
| RO Permeate | 0.0–0.0 | 0.0–0.0 | 0.0–0.02 | 0.0–0.05 | 0.0–0.05 |

Example 2

A blend composition comprising 2 wt % butter fat, 4.5 wt % protein, 0.8 wt % minerals and 2 wt % lactose was prepared by combining 5.01 v % cream, 32.1 v % UF retentate, 15.7 v % RO retentate and 47.19 v % water (see Table 3 below).

TABLE 3

| Blend Formulation | | Target Composition | |
|---|---|---|---|
| Cream | 5.01% | BF | 2.0% |
| UF retentante | 32.1% | Protein | 4.5% |
| RO Retentate | 15.7% | Minerals | 0.8% |
| Water | 47.19% | Lactose | 2% |

Example 3

A low fat composition comprising 0.26 wt % butter fat, 8.6 wt % protein, 1.6 wt % minerals and 3 wt % lactose was prepared by combining 63.6 v % UF retentate and 36.4 v % RO retentate (see Table 4 below).

TABLE 4

| Blend Formulation | | Target Composition | |
|---|---|---|---|
| Cream | 0% | BF | 0.26% |
| UF retentante | 63.6% | Protein | 8.6% |
| RO Retentate | 36.4 | Minerals | 1.6% |
| Water | 0% | Lactose | 3% |

Example 4

Table 5 illustrates representative composition prepared using the isolated milk components of the present invention.

TABLE 5

| | Target Compositions | | | |
|---|---|---|---|---|
| Product | Butter Fat | Protein | Lactose | Minerals |
| Low Carb | .05–5.5 | 3.0–10.0 | <1.0–3.0 | 0.65–2.0 |
| Kids Drink | .05–5.5 | 3.0–10.0 | <1.0–6.0 | 0.65–2.0 |
| Women Drink | .05–5.5 | 3.0–10.0 | <1.0–6.0 | 0.65–2.0 |
| Adult Drink | .05–5.5 | 3.0–10.0 | <1.0–6.0 | 0.65–2.0 |
| Athlete | .05–5.5 | 3.0–10.0 | <1.0–6.0 | 0.65–2.0 |
| Carb Drink | .05–5.5 | <1.0–10.0 | 6.0–10.0 | 0.65–2.0 |

Although this invention has certain preferred embodiments, it will be obvious to those skilled in the art that various changes and modifications may be made therein without departing from the invention, and all such changes and modifications are intended to fall within the true spirit and scope of the invention.

The invention claimed is:

1. A stepwise method for separating milk components comprising,
    passing milk into a filtration apparatus in a unidirectional flow;
    ultrafiltrating the milk in a first filtration step using an ultrafiltration means to produce a first liquid permeate and a first retentate, wherein the lactose content of the first permeate is no more than 5.5 wt %;
    nanofiltrating the first liquid permeate in a second filtration step using a nanofiltration means to produce a second liquid permeate and a second retentate, wherein the lactose content of the second permeate is no more than 0.15 wt %;
    reverse osmosis of the second liquid permeate in a third filtration step using a reverse osmosis means to produce a third liquid permeate and a third retentate, wherein the lactose content of the third retentate is no more than 0.06 wt %, and,
    wherein the first retentate, second retentate and third retentate are removed from the filtration apparatus through a first outlet, a second outlet and a third outlet respectively.

2. The method of claim 1 further comprising an optional separation step, wherein said separation step precedes the ultrafiltration step.

3. The method of claim 2 further comprising a microfiltration step, wherein said microfiltration step follows the optional separation step and precedes the ultrafiltration step.

4. The method of claim 2 further comprising a diafiltration step, wherein said diafiltration step follows the ultrafiltration step and precedes the nanofiltration step.

5. The method of claim 1, wherein the protein content of the first retentate is at least 9 wt % and the lactose content is at least 4 wt %.

6. The method of claim 1, wherein the lactose content of the second retentate is at least 13 wt %.

7. The method of claim 1, wherein the lactose content of the third liquid permeate is no more than 0.05 wt % and the mineral content is no more than 0.05 wt %.

8. A stepwise method for separating milk components comprising,
    passing milk into a filtration apparatus in a unidirectional flow;
    separating the milk to produce butter fat and skim milk;
    ultrafiltrating the skim milk to produce an ultrafitrarion permeate and an ultrafiltration retentate, wherein the lactose content of the ultrafiltration permeate is no more than 5.5 wt %;
    nanofiltrating the ultrafitration permeate to produce a nanofiltration permeate and a nanofiltration retentate, wherein the lactose content of the nanofiltratian permeate is no more than 0.15 wt %;
    reverse osmosis of the nanofiltration permeate to produce a reverse osmosis permeate and a reverse osmosis retentate, wherein the lactose content of the reverse osmosis retentate is no more than 0.06 wt %; and,
    wherein the ultrafiltration retentate, nanofiltration retentate and reverse osmosis retentate are removed from the filtration apparatus through a first outlet, a second outlet and a third outlet respectively.

9. The method of claim 8 further comprising a microfiltration step, wherein said microfiltration step follows the separation step and precedes the ultrafiltration step.

10. The method of claim 8 further comprising a diafiltration step, wherein said diafiltration step follows the ultrafiltration step.

11. The method of claim 8, wherein the protein content of the ultrafiltration retentate is at least 9 wt % and the lactose content is at least 4 wt %.

12. The method of claim 8, wherein the lactose content of the nanofiltration retentate is at least 13 wt %.

13. The method of claim 8, wherein the lactose content of the reverse osmosis permeate is no more than 0.05 wt % and the mineral content is no more than 0.05 wt %.

* * * * *

UNITED STATES PATENT AND TRADEMARK OFFICE
CERTIFICATE OF CORRECTION

PATENT NO. : 7,169,428 B2  
APPLICATION NO. : 10/229462  
DATED : January 30, 2007  
INVENTOR(S) : Dunker et al.

It is certified that error appears in the above-identified patent and that said Letters Patent is hereby corrected as shown below:

Table 2B should be inserted after Table 2A in Column 8, line 44.

Table 2B

| Range of Components (Separator Step Not Included) | | | | | |
|---|---|---|---|---|---|
| Product | Butter Fat | Protein | NPN | Lactose | Minerals |
| Whole Milk | 3.2-5.0 | 2.8-4.5 | 0.19 | 4.5-5.5 | .65-1.0 |
| UF Retentate | 10.0-17.5 | 9.5-16.0 | 0.28 | 4.0-5.5 | 1.75-2.25 |
| UF Permeate | 0.0-0.5 | 0.0-0.5 | 0.2 | 4.2-5.5 | 0.5-0.75 |
| Dia-Filtration | 10.0-17.5 | 9.5-16.0 | 0.15 | <1.0-3.0 | 1.65-2.10 |
| Dia-Permeate | 0.0-0.5 | 0.0-0.5 | 0.1 | 2.0-3.5 | 0.35-0.75 |
| NF Retentate | 0.5-1.25 | 0.0-1.0 | .30-.40 | 13.0-17.0 | 1.80-2.10 |
| NF Permeate | 0.0-0.1 | 0.0-0.1 | 0.05-0.1 | 0.05-0.15 | .05-.15 |
| RO Retentate | 0.0-0.1 | 0.0-0.1 | 0.1-0.3 | 0.02-0.06 | 0.5-0.75 |
| RO Permeate | 0.0-0.0 | 0.0-0.0 | 0.0-0.02 | 0.0-0.05 | 0.0-0.05 |

Signed and Sealed this

Twenty-fourth Day of February, 2009

JOHN DOLL  
*Acting Director of the United States Patent and Trademark Office*